(12) United States Patent
Valdmaa et al.

(10) Patent No.: US 9,815,225 B2
(45) Date of Patent: Nov. 14, 2017

(54) DEVICE FOR RECYCLING MIXED PLASTIC WASTE, A BLADE SYSTEM FOR SAID DEVICE AND A METHOD FOR RECYCLING MIXED PLASTIC WASTE

(71) Applicant: Rolan Investment OÜ, Tallinn (EE)

(72) Inventors: Andrus Valdmaa, Ülenurme Parish (EE); Aivo Käsnar, Tartu (EE); Aarne Saareväli, Tallinn (EE)

(73) Assignee: Rolan Unvestment OÜ, Tallinn (EE)

( * ) Notice: Subject to any disclaimer, the term of this patent is extended or adjusted under 35 U.S.C. 154(b) by 647 days.

(21) Appl. No.: 14/299,540

(22) Filed: Jun. 9, 2014

(65) Prior Publication Data

US 2015/0258713 A1  Sep. 17, 2015

(30) Foreign Application Priority Data

May 13, 2014 (EP) .................................... 14168154

(51) Int. Cl.
*B02C 18/00* (2006.01)
*B29B 17/04* (2006.01)
(Continued)

(52) U.S. Cl.
CPC ...... *B29B 17/0412* (2013.01); *B02C 18/0084* (2013.01); *B02C 18/086* (2013.01);
(Continued)

(58) Field of Classification Search
CPC ..... B29B 17/0412; B29B 17/04; B02C 18/18; B02C 18/086; B02C 18/0084
(Continued)

(56) References Cited

U.S. PATENT DOCUMENTS 2,186,716 A * 1/1940 Dieckmann ........... B02C 18/362
 241/282.2
2,259,623 A * 10/1941 Dieckmann ........... B02C 18/362
 241/292.1
(Continued)

FOREIGN PATENT DOCUMENTS

EP 0103754 B1 3/1984
EP 0620776 B1 10/1993

OTHER PUBLICATIONS

Densifier, Costarelli; http://www.costarelli.com/index.php?option=com_oziogallery2&view=02flashgallery&Itemid=115&lang=en; accessed on Sep. 11, 2014.
(Continued)

*Primary Examiner* — Faye Francis
(74) *Attorney, Agent, or Firm* — Berggren Inc.

(57) ABSTRACT

A blade system for device for recycling mixed plastic is disclosed. Furthermore, a device and a method for recycling unidentified, unclean, and unsorted mixed plastic into reusable plastic mixture is disclose. The present solution allows the recycling of mixed plastic waste outdoors, both in warm and cold climate conditions. In the course recycling mixed plastic waste the mixed plastic waste is taken to a melting temperature, at which the mixed plastic waste is mixed in a molten state, and the organic and bacterial material is destroyed during the thermal processing. After the melting, mixing and thermal processing of the mixed plastic waste, the compaction process of the molten mixed plastic waste is performed. Volume compacting is performed, and the mass of mixed plastic waste in a molten state is rapidly cooled down, crushed, after-cooled and homogenized.

12 Claims, 6 Drawing Sheets

(51) Int. Cl.
  B02C 18/08 (2006.01)
  B02C 18/18 (2006.01)
  B29B 9/02 (2006.01)
  B29B 9/12 (2006.01)
  B29B 17/00 (2006.01)
  B29K 101/12 (2006.01)
  B29K 105/26 (2006.01)

(52) U.S. Cl.
  CPC ............... B02C 18/18 (2013.01); B29B 9/02 (2013.01); B29B 9/12 (2013.01); B29B 17/0026 (2013.01); B29B 17/04 (2013.01); B29B 17/0036 (2013.01); B29B 2017/044 (2013.01); B29B 2017/048 (2013.01); B29K 2101/12 (2013.01); B29K 2105/26 (2013.01); Y02W 30/62 (2015.05); Y02W 30/625 (2015.05)

(58) Field of Classification Search
  USPC .............. 241/101.2, 282.1, 292.1; 366/343
  See application file for complete search history.

(56) References Cited

U.S. PATENT DOCUMENTS

| | | | | |
|---|---|---|---|---|
| 5,042,730 A * | 8/1991 | Hundt | ............... | B02C 18/143 144/176 |
| 5,184,780 A * | 2/1993 | Wiens | ............... | B03B 9/06 241/101.2 |
| 5,271,442 A * | 12/1993 | Carpenter | ............... | B27L 11/005 144/162.1 |
| 5,536,154 A * | 7/1996 | Bacher | ............... | B29B 13/10 241/101.2 |
| 5,566,889 A * | 10/1996 | Preiss | ............... | B29B 17/02 241/19 |
| 5,908,165 A | 6/1999 | Guschall et al. | | |
| 7,226,006 B2 * | 6/2007 | Porter | ............... | A61L 11/00 209/11 |
| 7,275,857 B2 | 10/2007 | Bacher et al. | | |
| 7,552,885 B2 * | 6/2009 | Katz | ............... | B01F 7/00275 241/282.1 |
| 7,562,836 B2 * | 7/2009 | Langston | ............... | B07B 13/00 100/315 |
| 8,444,076 B2 * | 5/2013 | Rukavina | ............... | A47J 43/0722 241/282.1 |
| 8,690,090 B2 * | 4/2014 | Kulesa | ............... | B29B 17/0026 241/101.2 |
| 8,690,093 B2 * | 4/2014 | Rukavina | ............... | A47J 43/0722 241/282.2 |
| 2012/0091609 A1 * | 4/2012 | Feichtinger | ............... | B29B 17/0026 264/37.31 |
| 2015/0239154 A1 * | 8/2015 | Feichtinger | ............... | B29B 17/0026 521/47 |

OTHER PUBLICATIONS

Aaron Equipment Company, Used Cavagion Agglomerator; http://www.aaronequipment.com/usedequipment/plastics-equipment/densifiers/cavagion-45415001; accessed on Sep. 11, 2014.
Industrial Machines, Essegiemme 1000; http://industrial-machines.net/search/machine.aspx?machineid=67233; accessed on Sep. 11, 2014.
OCI GmbH, Navarini, Densifier; http://www.navarini.com/densifier--.html; accessed on Sep. 11, 2014.
Aaron Equipment Company, Reg-Mac Used Tub Densifier; http://www.aaronequipment.com/usedequipment/plastics-equipment/densifiers/41203001; accessed on Sep. 11, 2014.

* cited by examiner

DEVICE FOR RECYCLING MIXED PLASTIC WASTE, A BLADE SYSTEM FOR SAID DEVICE AND A METHOD FOR RECYCLING MIXED PLASTIC WASTE

PRIORITY

This application claims priority of European patent application number EP14168154 filed on May 13, 2014, the content of which is fully incorporated herein by reference.

FIELD OF THE INVENTION

This present invention belongs in the field of recycling and the recovery of plastic waste, more specifically in the field of recycling unsorted, unidentified and unwashed mixed plastic waste of low volume weight.

BACKGROUND OF THE INVENTION

Plastic packaging (e.g. plastic bags, plastic packaging for ham, cheese, yoghurt, other foods and consumer products, and plastic utensils) and other plastic waste (e.g. bottle crates, garden furniture, buckets, plastic sledges, car bumpers, petrol cans, pipes, spools, computer shells, TV shells, plastic parts of fridges, etc.) are the most problematic and the fastest-growing type of waste. According to common solutions, this type of waste is primarily landfilled, burned or used as filler. These solutions pollute the environment, are expensive and waste material that could be used as a raw material for new products.

Aside from that, everyone knows about plastic-waste recycling solutions where the waste is first sorted, then cleaned, and plastics of the same type are recycled into a uniform mass, granules or new products. The process of recycling is type-based, which means that, for example, LDPE (plastic packaging and bags), HDPE (plastic bags and thick-walled plastic products) or PET (plastic bottles for beverages) waste is washed, crushed, dried and granulated. The plastics industry can use plastic granules made of one polymer as raw material for making new products. As sorting plastic waste by type is very expensive and time-consuming, mixed plastic waste that is not easy to sort is usually not recycled; it is either incinerated or landfilled.

As far as we know, there is no suitable solution for recycling polymers of different types. Compared to other materials, such as glass or metals, plastic polymers need to be processed longer to be recycled. The biggest problem is that polymers of different types do not mix because their molecular weight differs and they have long polymer chains. Heating polymers is not enough to break down their molecules. So, to be recycled, polymers often need to be identical to achieve effective mixing. If different types of plastic are melted together, according to known solutions they do not mix and form layers.

Such problems prevent the plastics industry from using unsorted mixed plastic waste, and sorting household and other plastic waste by types is very costly and almost impossible. The standard plastics industry that puts hundreds of millions of tons of plastic products on the market is set up to use 'virgin' or primary single-type plastic granules (LDPE, HDPE, PS, PP, PET, AB, composites (PS/PP, PP/PE, PS/PC) HIPS, EPS, PA, POM, PC, etc.), and its technological production solutions are not able to handle mixed or unclean plastic waste.

Various solutions attempting to recycle mixed plastic waste of different types are known from the state of the art of the recycling field. Such solutions, however, also involve sorting and/or the adding of other materials during the recycling process, to facilitate better binding of the mixture obtained by recycling.

E.g. the European patents EP0103754B1 (Dr. HERFELD GmbH & Co. KG) 28.05.1986, EP0620776B1 (Dr. HERFELD GmbH & Co. KG, Konrad Hornschuch Aktiengesellschaft) 15.01.1997, EP0800445B2 (Der Grune Punkt-Duales System Deutschland Aktiengesellschaft) 01.06.2005, describe solutions performing the recycling of plastic waste in a mixer or other similar device equipped with a rotating blade system, by crushing, heating until melting, compacting, and rapidly cooling the plastic waste. E.g. the U.S. Pat. No. 7,275,857 of the USA (Erema Engineering Recycling Maschinen Und Anlagen Gesellschaft M.B.H.) Feb. 10, 2007 describes a system of rotating blades for recycling mixed plastic waste, where a rotating disk located in the agglomeration chamber has blades attached to it at an angle, with their ends extending over the edge of the rotating disk towards the walls of the chamber.

The plastic waste compacting equipment of Costarelli (http://www.costarelli.com/index.php?option=com_oziogallery2&view=02flashgallery&Itemid=115&lang=en), Navarini (http://www.navarini.com/ML1400_e.htm), Cavagion (http://www.aaronequipment.com/usedequipment/plastics-equipment/densifiers/cavagion-45415001), Essegi-emme (http://www.machinads.com/1496-essegiemme-agglomerator-500-kg-hr/details.html), and Reg-Mac (http://www.aaronequipment.com/usedequipment/plastics-equipment/densifiers/41203001), where plastic waste is crushed, heated, melted, and rapidly cooled with cold water, and the cooled-down plastic mixture is crushed, can be considered closest to the present solution. The blade system used by the equipment comprises a blade with two vanes mounted on a shaft. Such solutions are meant for processing non-rigid industrial or collected single-type plastics (e.g. PET, plastic film etc.). The plastic waste is taken to a granulating chamber, heated and melted, accompanied by mechanical processing to reduce its volume and remove moisture, obtaining spherical particles of irregular shape and size. The blade rotating at high speed initially cuts finely and gradually. The melting temperature is obtained due to mechanical friction. Adding cold water and using thermal shock achieves rapid aggregation, which is broken up by the blades at the same time.

Solutions known from the state of the art in the recycling field are only suitable for processing single-type identified plastic waste of low volume weight as the design of their blade systems causes the blades to wear out too quickly due to forces created in the course of processing mixed plastic waste of different volume weights, friction and high temperatures, or alternatively the equipment is too weak for making the blade system rotate at sufficient speed to achieve the melting temperature and crush the rapidly cooled-down plastic mixture again. Aside from that the solutions known from the state of the art of the recycling field cannot be used outdoors at temperatures below +5° C. The need to use warm insulated rooms makes recycling plastics complicated and expensive.

The known solutions require the preliminary washing of the plastic waste. This makes the plastic waste recycling process too energy intensive and environment polluting. The plastic waste must also be sorted preliminarily, and as only one type of non-rigid plastic waste can be processed at a time, the recycling productivity is extremely low, and recycling is time-consuming and energy intensive. When used indoors, the known solutions require the ventilation of the facilities and heating in winter. That also increases the energy consumption of the process. Water consumption for cooling during the final stage of the compacting process is too high. The blades of the known solutions are used to cut and must be sharpened up to once a day; aside from that the blades withstand less heat and melt, creating non-uniform fragments.

The shortcoming of the known solution is the weakness of the blade system design, which causes the blades to wear out quickly, fail to sufficiently crush the processed material, or break; these solutions do not enable the recycling of plastic waste in winter conditions, are too energy intensive, and pollute the environment. For these reasons, they do not allow the recycling of unidentified, unclean, and unsorted mixed plastic waste.

SUMMARY OF THE INVENTION

A device for recycling mixed plastic is disclosed, where the device comprises an agglomeration chamber base, an agglomeration chamber, an observation and service opening, a recycled plastic mixture outlet port, a loading chamber equipped with a loading port and an upper observation opening, a motor, a switchboard, a collar attached to the bottom of the agglomeration chamber, a shaft running through the bottom and collar, and attached to the motor, a blade system attached to the shaft, and exhaust fan for water vapor, wherein: closed bearings and pressure seals have been provided for the bearing pedestal of the shaft, the agglomeration chamber comprises a double wall, and the equipment is provided with a cooling system equipped with a cooling inlet and a cooling outlet, a transmission and lubricating chamber, and a lubricating pump, equipped with an additional preheater.

In one aspect of the invention, the double wall of the agglomeration chamber comprises at least three replaceable parts with their height greater than the thickness of the belt of the mixed plastic waste being recycled in the agglomeration chamber, and the potential height to which the mixed plastic waste particles can be thrown in the course of the crushing process.

In one aspect of the invention, the rotation speed of the blade system of the device is approximately 1200 rpm during the recycling process, the amperage is approximately 600 A, and the temperature in the agglomerating chamber is approximately 140 to 160° C. The recycling cycle may last approximately 5-15 minutes. The distance between the outer blade of the blade system and the double wall of the agglomeration chamber is approximately equal to the thickness of the blade.

In one aspect of the invention a blade system for a device for recycling mixed plastic waste is provided where said system comprises: a blade holder, two material exit guides, two inner blades, two outer blades, two blade mounting plates, and fasteners, wherein: the blades are attached to the blade holder reversed, so that the cutting surface of the blades is towards the bottom of the agglomeration chamber, and the bottom surface of the blades is upwards, the parts of the assembled blade system form the even surface of the blade system, the fasteners installed in the blades are coplanar to the surface of the blades when tightened, and the blades crush the material of the mixed plastic waste being recycled.

In one aspect of the invention a method for recycling mixed plastic waste is provided where the method comprises the steps of: a preliminary processing of the mixed plastic waste, the routing of the pre-processed mixed plastic waste to the device for recycling mixed plastic waste, the recycling of the mixed plastic waste in the device by heating, melting, mixing, reducing the cubic content of the recycled material, cooling, crushing, and post-processing, wherein the mixed plastic waste is mixed in a molten state, and the organic and bacterial material is destroyed during the thermal processing, and that the method for recycling mixed plastic waste includes the following stages: the blade system of the device for recycling mixed plastic waste is started at the approximate rotation speed of 1200 rpm; the mixed plastic waste to be recycled in a quantity of 60-150 kg is taken to the agglomeration chamber; the mixed plastic waste is crushed using the blade system by simultaneously mixing, heating and melting it at the temperature of approximately 140-150° C., and achieving the amperage of approximately 400 A for the motor; the temperature is increased to the level of approximately 150° C. to 160° C., and the amperage to 600 A, and the plastic mass obtained is rapidly cooled down to harden when this level is achieved; crushing of the hardened mass is started; increasing of the temperature and amperage is started; the outlet port is opened at the temperature of 100-110° C.; the amperage is increased to 600 amperes; the crushed recycled mixed plastic waste fragments are routed from the agglomeration chamber to the after-cooler; the plastic mass is taken to homogenization from the after-cooler.

The aim of the present invention is to propose a solution for recycling unidentified, unsorted, and unclean mixed plastic waste of different types and low volume weight into a reusable plastic mixture free from the abovementioned shortcomings of the prior art. The aim of the invention is achieved with plastic waste recycling device differing from the ones of the known solutions, a blade system for compacting and agglomerating the plastic waste, and a process for processing mixed plastic waste.

Plastics of low volume weight (0.1-0.15 (up to 0.4) t/m3) are mainly, for example, highly volitant plastic packaging from households, such as plastic bags and packages for ham, cheese, yoghurt, and other foods and consumer products. These packages are the most problematic and constantly growing type of plastic waste that is currently only either landfilled or incinerated. Statistically, the low volume weight group of plastic waste includes on average: polyethylene (PE) (approximately 50-60% of the volume), polypropylene (PP) (approximately 20-30% of the volume), polystyrene (PS) (approximately 5-10% of the volume), and other unidentified plastics (e.g. polyamides (PA), Polyethylene terephthalate PET, Polyacetal (POM), Polycarbonate (PC), composite plastics etc.; 1-10% of the volume).

The device for recycling plastic waste according to the present invention reduces the cubage of plastic waste, increases its density, mixes the plastic waste in the molten state, destroys the organic and bacterial material, and creates a stable raw material with a fragment size of approximately 3 to 10 mm and moisture content below 1%, suitable for the subsequent production process.

In contrast to the known solutions used for compacting clean single-type polymer materials of low volume weight, which are routed to subsequent regranulate production, the solution according to the present invention is used for compacting and recycling unsorted, unidentified, and unclean mixed plastic waste.

The known solutions use an agglomerator for compacting clean single-type highly volatile polymer plastic materials, which are routed to subsequent regranulate production. The solution according to the present invention uses device for recycling mixed plastic waste for recycling unsorted, unidentified and bacterial mixed plastic waste. The device for recycling mixed plastic waste uses unwashed, unsorted, unidentified, and soiled mixed plastic waste for raw material, potentially containing organic materials, metals, minerals and other non-polymer input materials.

In contrast to known agglomerators the solution according to the present invention does not require preliminary washing or other cleaning of the mixed plastic waste and allows the recycling of the mixed plastic waste outdoors at temperatures below zero.

Unlike the recycling of clean, sorted and identified plastic waste, the agglomeration process used for recycling unclean mixed plastic waste involves significantly stronger forces, higher temperatures, and more wear and tear. To make the blade system run at sufficient capacity, the motor used must be more powerful than that of the known solutions. Using a powerful motor will increase vibration, and this in turn will place the shaft, transmission, blade system and other parts in danger of breaking. The melting and mixing of mixed plastic waste requires achieving higher temperatures than the recycling of single-type plastic waste. The blade systems and other chamber parts of the known solutions start to deform or melt due to higher temperatures. Recycling mixed plastic waste involves materials having different characteristics, which makes the blade system and other chamber parts of the known solutions wear out too quickly. To solve such problems, the blade system blades of the device according to the present invention are different from the blades of the known solutions, being more durable and having a cutting surface structure that allows the recycling of unidentified, unclean mixed plastic waste of different types at high temperatures, a blade system rotating at speeds without breaking and extensive wear, and the achievement of higher temperatures for longer periods of time in the mixing, melting, compacting and crushing process.

The blades used by the solution according to the present invention allow the production of an agglomerate of suitable properties and fragment size, with its density and fluidity suitable for manufacturing new plastic products from the mixed plastic waste.

In contrast to the known solutions the internal walls of the chamber of the device according to the present invention are built to be more wearproof and resistant to the abrasiveness of the unclean mixed plastic waste. This has been achieved by the use of double walls in the working zone of the blade system, which are made of more wearproof metal are quickly replacable, and comprise at least three parts.

The construction of the internal walls and blade system of the device according to the present invention allows the performance of the agglomeration process at higher temperatures than the known solutions and the destruction of the bacterial input during the same cycle.

The generally known solutions require approximately 15 liters of water for cooling during the final stage of the compaction process, while the process of the present invention uses approximately 2-3 liters of water for cooling.

To allow for use in winter conditions at temperatures below zero, the water system of the present invention has been equipped with an additional heat insulation solution, which is lacking in the known solutions. The higher operating temperature achieved due to the construction of the blade system, which exceeds the temperatures of the known solutions, also allows the use of the present solution outdoors, including at temperatures below zero.

In contrast to the known solutions, frost-proof coolant-based cooling has been used for the cooling system of the device for recycling mixed plastic waste instead of water cooling, achieving cooling of the device in warm climate conditions, and additional heating in cold climate conditions. The lubrication solution of the device uses greater pressure and lubricates more efficiently than that of the known solutions. This has been achieved by using different lubricating oil grades for cold and warm climate conditions, and adapting their usage to the tasks set for the device. To make the lubricating system perform better and more seamlessly, in contrast to the known solutions an additional heating system has been provided for the lubricating system, linked to the temperature of the coolant circulating through the cooling system. This in turn serves to achieve additional stability and production capacity. The additional heating system allows the invention to be used in cold climate conditions.

As a result of the high temperature created by the production process of the device for recycling mixed plastic waste the agglomerate exits the production process at the temperature of approximately 100 degrees. The known solutions route the compacted clean materials to subsequent regranulate production; according to the present invention the material passes through an additional several-hour cooling cycle in cooling tower 11, stabilizing the properties of the polymers for the subsequent production cycle.

The device for recycling mixed plastic waste uses unwashed, unsorted, and unidentified mixed plastic waste for raw material, potentially containing organic materials, metals, minerals and other non-polymer input materials. The known agglomerators do not allow the processing of such input material. Using the known agglomerators prescribes a preliminary washing process for the raw materials that is obviously too energy intensive and environment polluting. In contrast to the known solutions the device and method for recycling mixed plastic waste of the present invention do not involve cleaning. As the device for recycling mixed plastic waste is used at a waste-recycling site, often at a landfill site, and the production rooms must be ventilated using ambient air, in contrast to the generally known agglomerators the operating mode of the device for recycling mixed plastic waste is capable of working at temperatures below zero.

The blades of the blade system according to the present invention are thicker and more durable and equipped with a cutting surface structure different from the known solutions, allowing the achievement of higher temperatures for longer periods of time in the mixing, compacting and crushing process.

The blade system having a construction according to the present invention allows the production of an agglomerate of suitable properties and fragment size, with its density and fluidity suitable for subsequent production stages of the recycled mixed plastic waste mixture.

Closed bearings and pressure seals have been provided for the bearing pedestal of the shaft of the device for recycling mixed plastic waste. This has significantly increased the compression and pressure of the recycling process compared to the known solutions, and also allows the achievement of higher temperatures, resulting in increased productivity for the simultaneous recycling of different polymer materials. The solution according to the present invention also achieves significantly higher temperatures compared to the known solutions, resulting in increased productivity for the simultaneous recycling of different polymer materials. The bearing pedestal of the known solutions is not durable enough and would break in the course of recycling mixed plastic waste if the motor capacities and temperatures used by the method according to the present invention were applied. The bearing pedestal is located under the bottom of the agglomeration chamber of the device for recycling mixed plastic waste. Its weight has been increased and cooling provided using frost-proof coolant circulated through an heat exchanger. The bearing pedestal is lubricated using a pump, and additional preheating of the lubricating oil is performed in cold climate conditions. The cooling of the bearing pedestal is performed via the bearings of the bearing pedestal, using oil.

Due to the non-uniform composition of the mixed plastic waste, vibration is created in the device used to crush it. In the case of the known solutions the connection of the blade system to the shaft and/or the connection of the shaft to the engine are not capable of withstanding the forces created during the device operation and break.

BRIEF DESCRIPTION OF THE DRAWINGS

The present invention is explained more precisely with references to figures added, where.

DETAILED DESCRIPTION OF THE INVENTION

Figure 1:
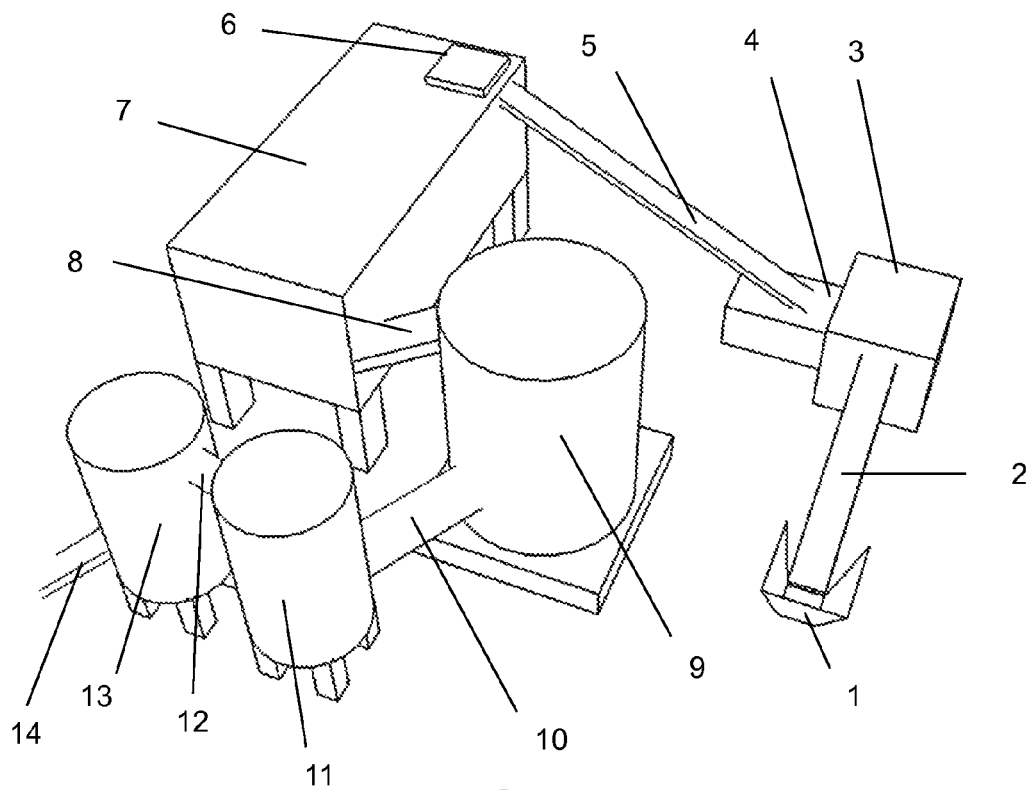
FIG. 1 presents the general diagram of the system for recycling mixed plastic waste, including the device for recycling mixed plastic waste according to the present invention.

The system for recycling unsorted mixed plastic waste into homogenized raw material mass of unidentified, unclean, and unsorted mixed plastic waste of different densities and low volume weight, presented in FIG. 1 comprises input 1 for the mixed plastic waste, waste crusher 3, connected with the input 1 via a feed conveyor 2, metal separator 4 connected with the waste crusher 3, air separator 6 and collecting container 7 connected with the metal separator 4 via the first conveyor 5, device for recycling mixed plastic waste 9 according to the present invention, connected with the collecting container 7 via the second conveyor 8, after-cooler 11 connected with the device for recycling mixed plastic waste 9 via the third conveyor 10, homogenization device 13 connected with the after-cooler 13 via the fourth conveyor 12, and an outlet conveyor 14.

The system presented in FIG. 1 performs the preliminary processing of mixed plastic waste, the method for recycling mixed plastic waste according to the present invention, and after-cooling of the granulated mass created from the mixed plastic waste in the course of recycling. An alternative solution of the method for recycling mixed plastic waste according to the present invention performs the preliminary processing of the mixed plastic waste outside the system presented in FIG. 1, and they are routed directly to the device for recycling mixed plastic waste 9.

Figure 2:
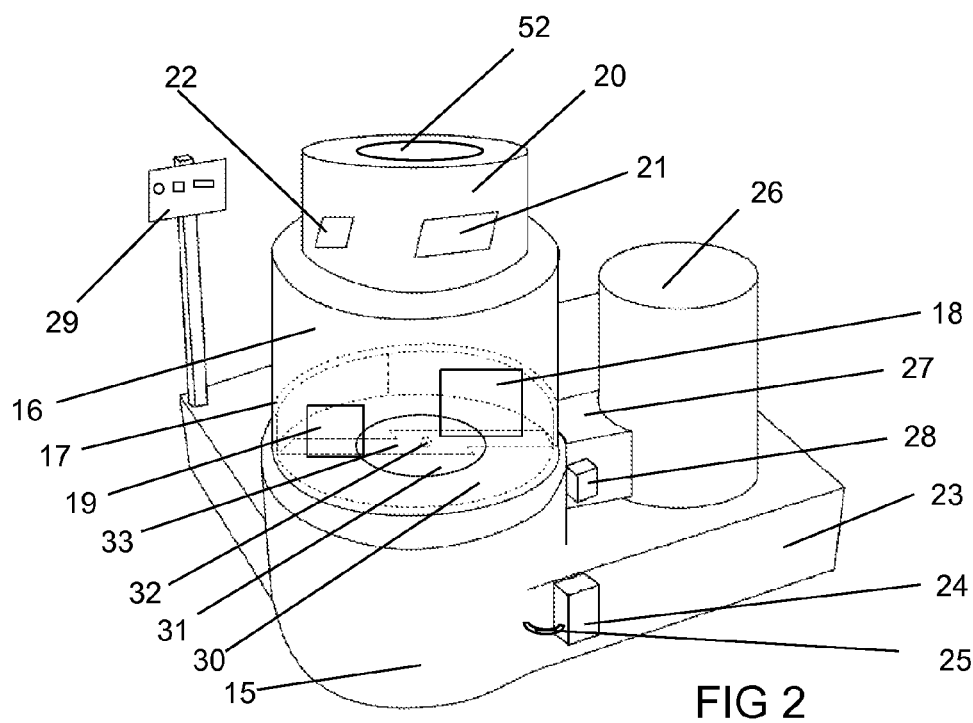
FIG. 2 presents the device for recycling mixed plastic waste according to the present invention with the location of the blade system shown.

The device for recycling mixed plastic waste 9 according to the present invention presented in FIG. 2 comprises an agglomeration chamber base 15, agglomeration chamber 16, equipped with a double wall 17, observation and service opening 18 (for visual inspection by technical/maintenance personnel, and replacing of the blade system parts and double walls), and recycled plastic mixture outlet port 19, loading chamber 20 equipped with a loading port 21 and an upper observation opening 22, cooling system 23 equipped with the cooling inlet 24 and cooling outlet 25, motor 26, transmission and lubricating chamber 27, pre-heated lubricating pump 28, switchboard 29, collar 31 attached to the bottom 30 of the agglomeration chamber 16, shaft 32 running through the bottom 30 and collar 31, and connected with the motor 26, blade system 33 according to the present invention attached to the shaft 32, and exhaust fan for water vapor 52.

Due to the abrasiveness and high temperatures of the mixed plastic waste, an additional double wall 17, manufactured of at least three parts has been provided for the inner wall of the agglomeration chamber 16 for higher wear resistance and durability, with its height greater than the thickness of belt of the mixed plastic waste being recycled, and the height to which the mixed plastic waste particles can be flown in the course of being crushed. To achieve better wear resistance, the double wall 17 has been manufactured of abrasion resistant material with a hardness of at least 450 HBW.

In the course of the melting process of the device for recycling mixed plastic waste 9 unsorted, unidentified, and unclean mixed plastic waste is taken to melting temperature, at which the mixed plastic waste is mixed in a molten state, and the organic and bacterial material is destroyed during thermal processing. After the melting, mixing and thermal processing of the mixed plastic waste, the compaction process of the molten mixed plastic waste is performed. The compaction of the volume of up to approximately ten times is performed. The mass of mixed plastic waste taken to a molten state in the course of the melting process is rapidly cooled down by the spraying of approximately 2 to 3 liters of water, preferably to approximately 4° C. to 10° C., causing the molten mass to harden. The blade system blades of the device for recycling mixed plastic waste that were initially mixing the molten mass now start to crush the hardened mass.

FIGS. 3 to 7 present the blade system 33 of the device for recycling mixed plastic waste 9 according to the present invention, comprising a blade holder 34, two material exit guides 35, two inner blades 36, two outer blades 37, two blade mounting plates 38, and fasteners (e.g. bolts) of the blade holder 34, material exit guide 35, blades 36 and 37 and mounting plate 38. To achieve better wear resistance, the parts of the blade system 33 have been manufactured of abrasion resistant material with a hardness of at least 450 HBW.

The blade systems used by known solutions are not able to withstand the friction, high temperatures, vibration and high power; they quickly grow blunt and worn, and break. To solve this problem the parts of the blade system according to the present invention have been designed to be more durable; this has been achieved by using thicker blades with their cutting angles and construction different from the ones used by known solutions.

Figure 3:
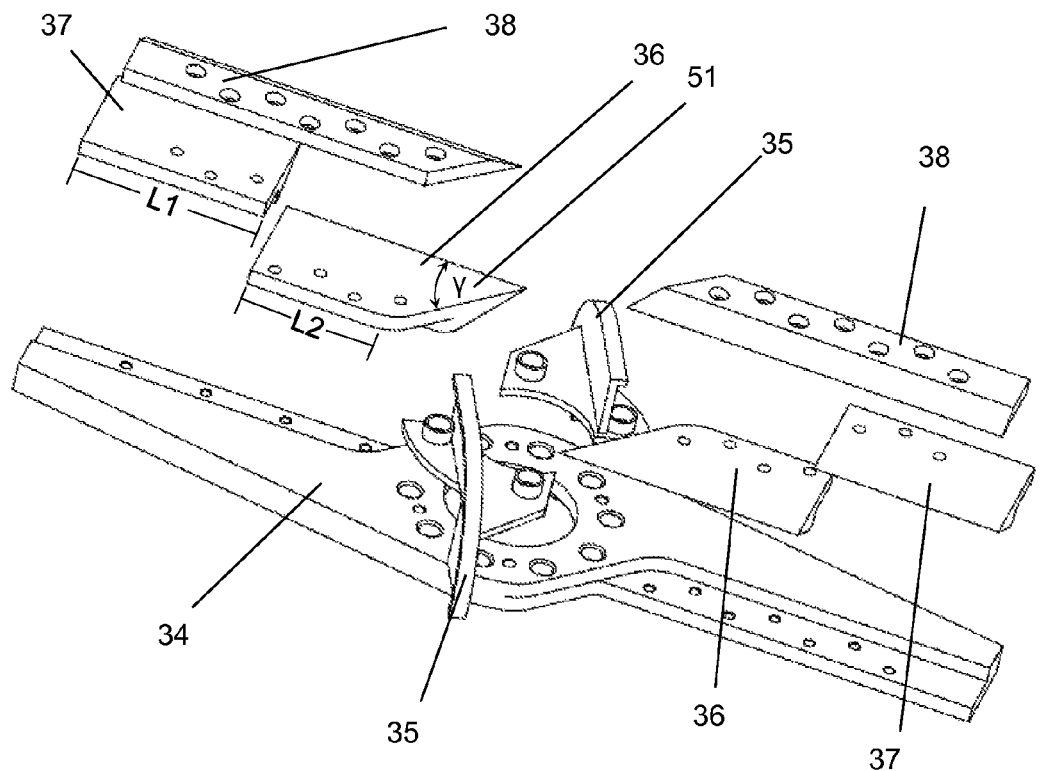
FIG. 3 presents the perspective view of the parts of the blade system according to the present invention.
Figure 4:
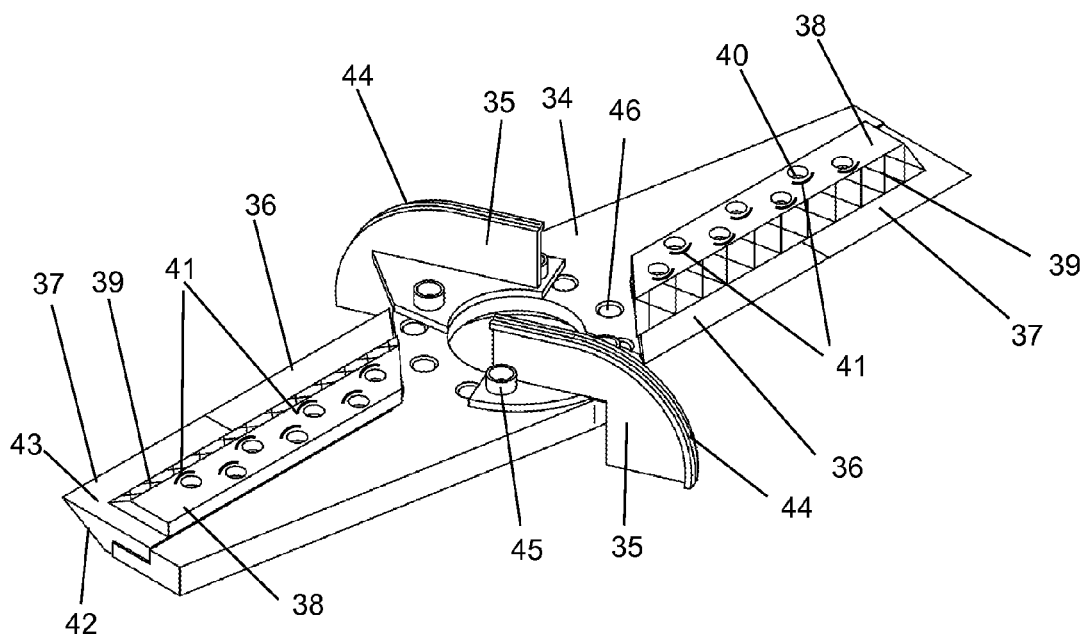
FIG. 4 presents the perspective view of the blade system according to the present invention.
Figure 5:
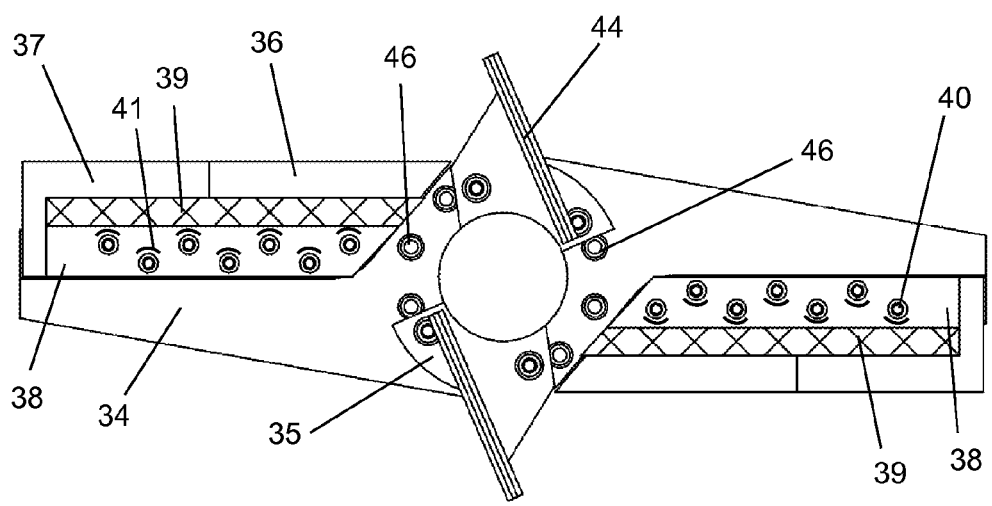
FIG. 5 presents the top view of the blade system depicted on FIG. 4.
Figure 6:
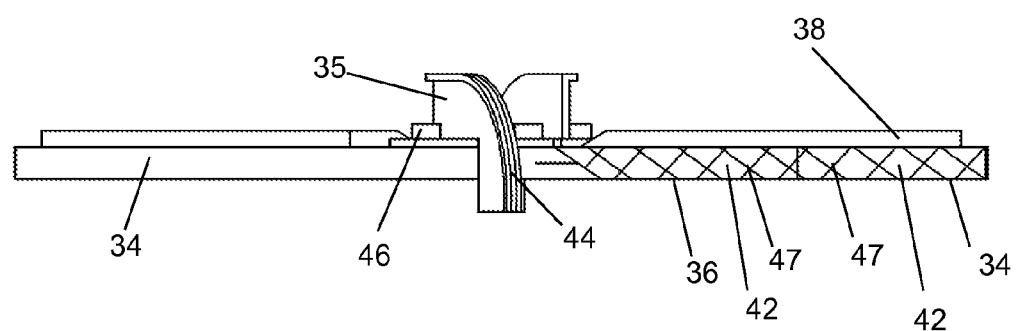
FIG. 6 presents the side view of the blade system depicted on FIG. 4.
Figure 7:
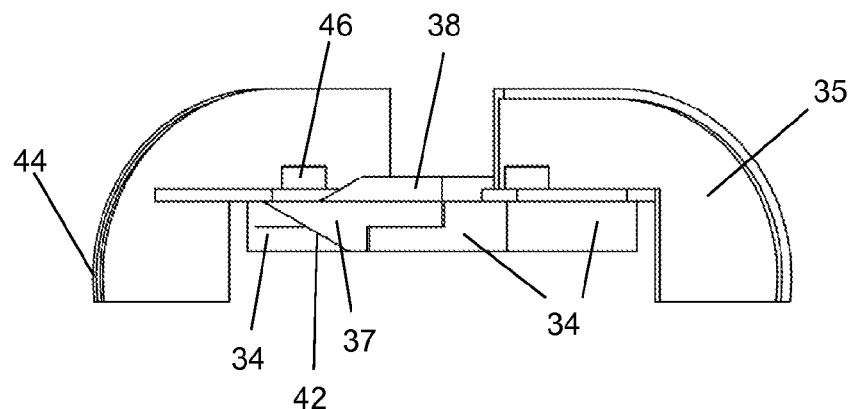
FIG. 7 presents the end view of the blade system depicted on FIG. 4.

FIG. 3 depicts the length L1 of the outer blade 37 of the blade system according to the present invention, and the side length L2 of the inner blade at the side towards the holder 34, that according to the preferred embodiment are approximately equal, L1≈L2. If L1>L2, the outer blade 37 would wear more quickly and more extensively, because according to the preferred representation the outer blade 37 works more intensively. If L1<L2, partial uneven wearing of the inner blade 36 would occur. The fraction size decreases due to worn blades. The alternative representation of the invention has the same volume of the agglomeration chamber 16, but the quantity of the mixed plastic waste input for recycling has been increased, the length L1 has been increased, and the length L12 decreased, and L1>L2; or the quantity of the mixed plastic waste input for recycling has been decreased, and in that case a blade system with L1<L2 has been used.

FIGS. 4 to 7 present various views of the assembled blade system according to the present invention. According to the preferred representation of the blade system the cutting surface of the blade mounting plates 38 has been hardfaced 39 to ensure melting and wear resistance. Welded strips of hard metal 41 have been provided in front of the fastening holes 40 of the mounting plate 38 in the direction of rotation, preferably e.g. crescent-shaped. In contrast to the known solutions, to achieve larger impact forces, the inner blades 36 and outer blades 37 of the blade system have been attached to the blade holder 34 reversed, with the cutting surface of the blades 42 downwards toward the agglomeration chamber 16 bottom 30, and the bottom surface 43 of the blades upwards as depicted in FIGS. 3 to 7. The material guides 35 are hardfaced 44. The material guides 35 have been attached to the blade holder 34 e.g. by welding and/or using a bolted connection 45. The blade system 33 has been attached to the shaft with bolts 46. The collar 31 has been attached to the bottom, and also welded in addition to the bolted connection.

Figure 9A:
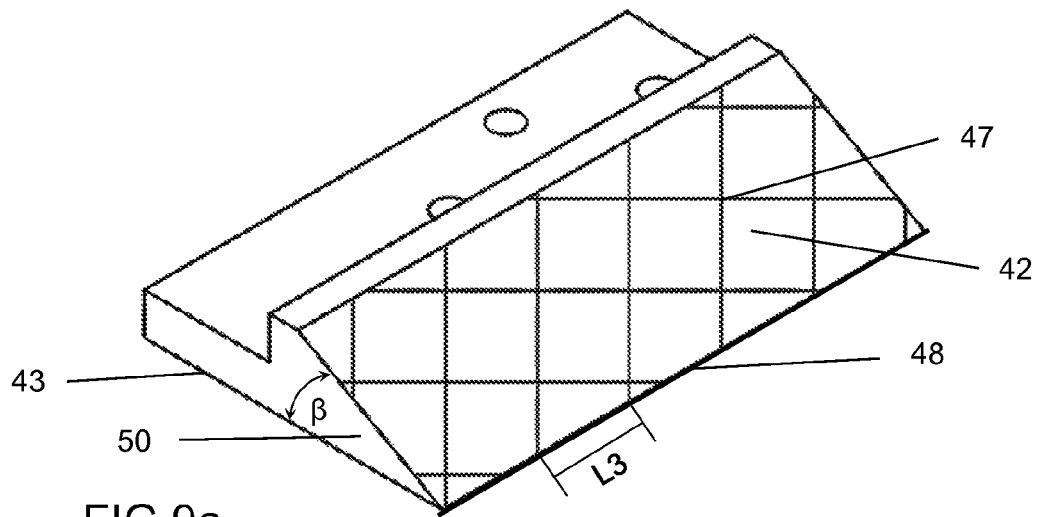
FIGS. 9a to 9c present the outer blades of the blade system in case of various implementation examples.
Figure 9B:
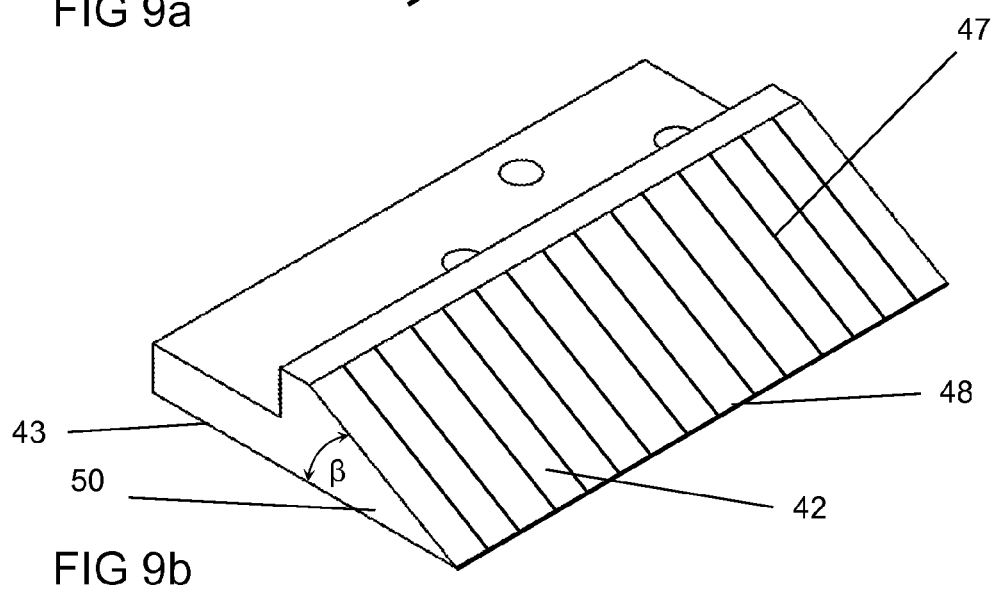
Figure 9C:
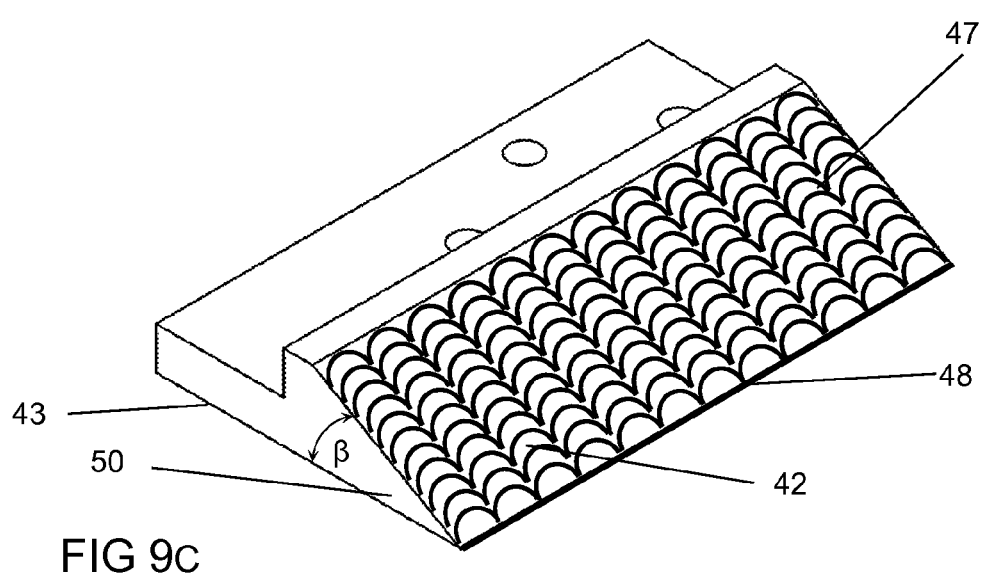
Figure 10A:
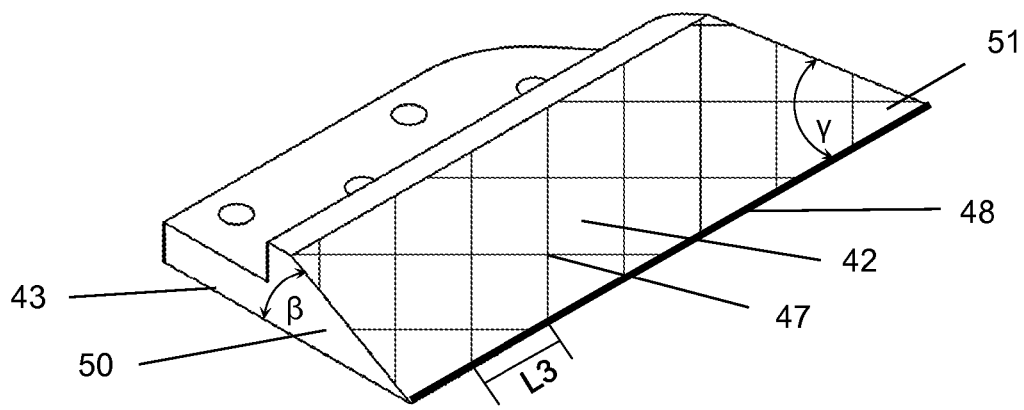
FIGS. 10a to 10c present the inner blades of the blade system in case of various implementation examples.
Figure 10B:
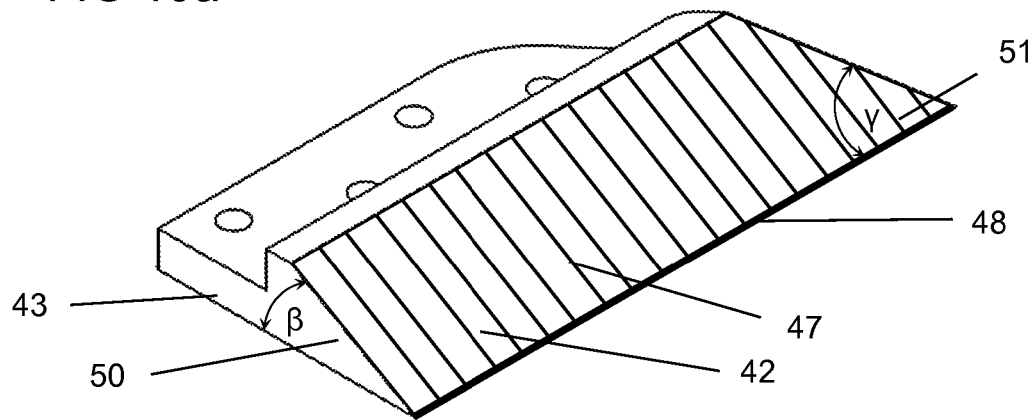
Figure 10C:
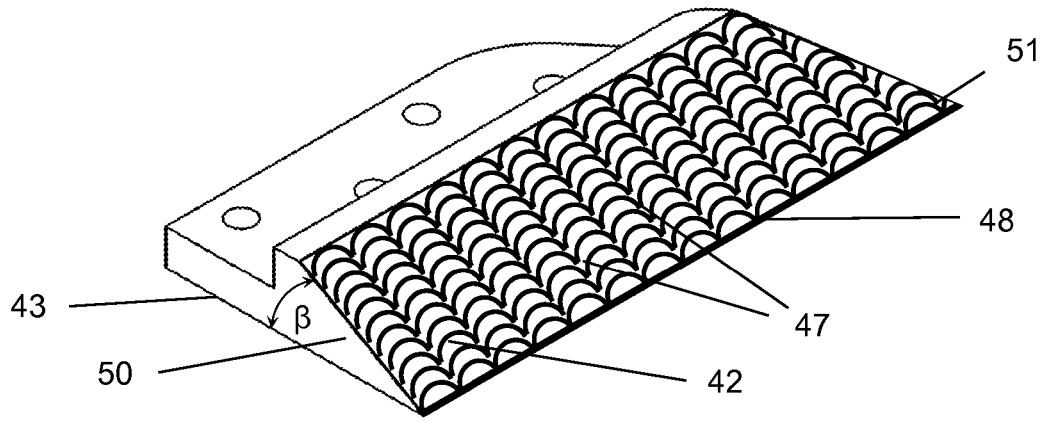

To achieve better wear resistance, the cutting surface 42 of the inner blades 36 and outer blades 37 has been hardfaced 47, and the cutting edge 48 of the blades has been blunted by hardfacing. FIGS. 9a to 9c present various preferred representations of the hardfaced cutting surfaces of the outer blades 37, FIGS. 10a to 10c present various preferred representations of the hardfaced cutting surfaces of the inner blades 36; scale-like welding applied on the cutting surface of the blades is the most preferred due to its highest wear resistance (depicted on FIGS. 9c and 10c). To achieve higher durability, also other pattern-shaped hardfacing types are preferred, creating e.g. hardfaced stripes diagonal to the cutting edge 48 on the cutting surfaces of the blades (with its implementation example presented on FIGS. 9a and 9b), or grooves formed by hardfacing, perpendicular to the cutting edge 48, with their implementation examples presented on FIGS. 10a and 10b.

In contrast to the known solutions having the blades cut the material being recycled, the reversed placement of the blades, blunted cutting edge 48 and the cutting surface hardfaced with various patterns of the present invention achieve the effect of making the blades 36 and 37 crush the mixed plastic waste material being recycled instead of cutting it, due to creating an impact effect.

Figure 8:
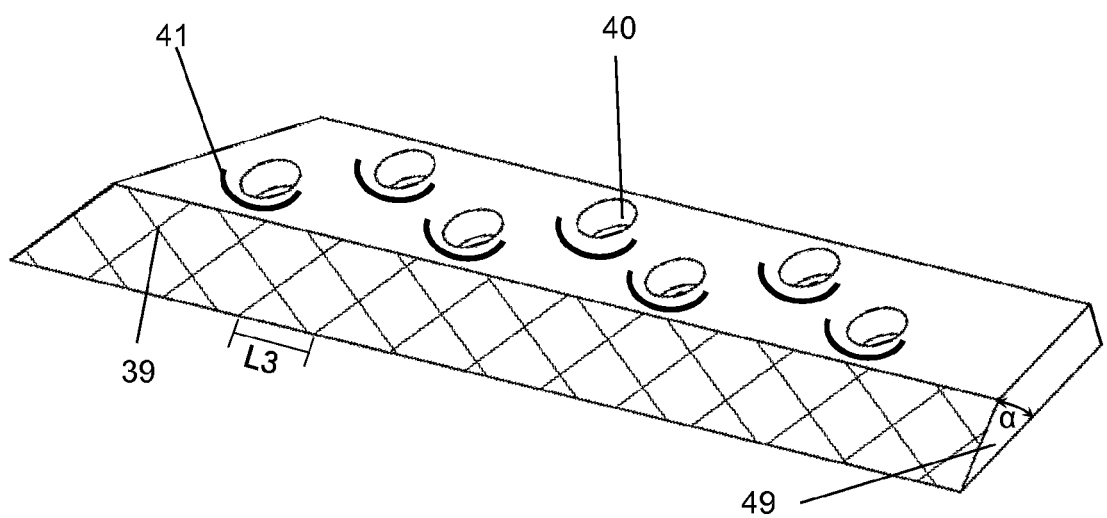
FIG. 8 presents the perspective view of the mounting plate of the blade system blades.

The step of the rhombic weld pattern applied on the blade mounting plate 38, outer blade 37 and inner blade 36, presented in FIGS. 8, 9a and 10a, respectively, is approximately 20 to 30 mm.

This achieves higher durability and wear resistance with respect to temperature and friction. Such design of the blades also ensures uniform fragments when crushing the material being recycled.

In contrast to generally known solutions, where the heads of the fasteners extend out of their holes, and as a result wearing quickly, the blades of the present invention have been thickened, creating deeper fastener holes, and allowing the tightened fastening bolts to remain coplanar to the surface of the blades.

The cutting angle α 49 of the blade mounting plate 38 presented on FIG. 8, and the cutting angle β 50 presented in FIGS. 9a, 9c and FIGS. 10a to 10b are approximately 28-32°. Having the cutting angle within this range achieves the best crushing effect, and at the same time the blades 36, 37 and blade mounting plate 38 last the longest.

The angle γ 51 between the cutting edge of the inner blade 36, and the edge at the side of the material exit guide 35 is preferably approximately 50°. The blades 36 and 37, and the blade mounting plate 38 have shape and dimensions allowing the parts of the blade system 33 to form such a level/even surface by assembly of the blade system 33 that the mixed plastic waste material being crushed would be thrown away from the blade system surface, not slide and rub against it as it does according to the known solutions. Using such a construction achieves higher and better resistance to high temperatures and friction for the blade system and its parts.

In contrast to the known solutions the blades of the blade system of the present invention strike and crush the material instead of cutting it, and create a uniform fragment.

The rotating speed of the blade system 33 generated by the motor 26 is approximately 1200 rpm, and at the amperage of ca 600 A the temperature of approximately 160° C. is achieved in the agglomeration chamber 16 due to friction after the mixed plastic waste has been melted and mixed to a uniform mass at the temperature of approximately 150-160° C.; then the sprinkler is turned on.

To ensure higher productivity (kg/h) when using an agglomeration chamber 16 of the same volume, a more powerful motor 26 is used, enabling larger quantities of material to be input at a time (batch kg) and increasing the productivity (kg/h). The more powerful the motor used, the more durable must be the transmissions, blade system 33, and agglomeration chamber of the device for recycling mixed plastic waste. Different preferred alternative implementation examples for using motors of varying power while the volume of the agglomeration chamber 16 used remains the same are provided below.

|  | Implementation example 1 | Implementation example 2 | Implementation example 3 |
| --- | --- | --- | --- |
| Motor (HP) | 540 | 420-340 | 270-220 |
| Drum size (mm) | 200 | 1,200 | 1,200 |
| Batch (kg) | 100-150 | 75-120 | 60-80 |
| Productivity (kg/h) | 1,000-1,500 | 800-1,000 | 450-650 |

One recycling cycle lasts approximately 5-15 minutes. The preferred representation of the solution according to the present invention uses the implementation example 2. When increased productivity is required, the input quantity of mixed plastic waste to be recycled is increased, the capacity of the motor is also increased, and the thickness of the belt of mixed plastic waste being recycled also increases due to centrifugal force; this brings about the need to extend the outer blade and shorten the inner blade. For example, when using an additional quantity of ca 50 kg of mixed plastic waste to be recycled for the alternative representation of the present invention, the length L1 of the outer blade 37 has been increased by 25 mm, and the length L2 of the inner blade 36 has been decreased by 25 mm.

For other alternative representations the diameter of the agglomeration chamber 16 has been changed. For example, when the diameter of the agglomeration chamber 16 is increased or decreased by x percent, the length, thickness, and width of the parts of the blade system 33 are proportionally increased or decreased by x percent, whereas the distance between the outer blade 37 of the blade system 33, and the inner double wall 17 of the agglomeration chamber is approximately equal to the thickness of the blade. The larger this gap the more untreated material will end up inside it. When the distance between the outer blade 37 of the blade system 33, and the inner double wall 17 of the chamber is less than the approximate blade thickness, the blade could come into contact with the casing due to the temperature rising and parts expanding, making the gap smaller.

In contrast to the known solutions, using riveted connections for the inner walls of the agglomeration chamber 16, the inner walls of the agglomeration chamber 16 of the present invention are provided with bolted connections.

The material guides 35 of the blade system 33 route the material to the impact zone of the blades 36 and 37.

Achieving 160° C. depends on the moisture content of the material, the ambient temperature, and the productivity.

The temperature of the material is 180-190° C. at the agglomeration chamber 16 temperature of 160° C.; mostly the mixed plastic waste is melted into a uniform mass at that temperature. The mixed plastic is not yet overheated. Raising the temperature of the agglomeration chamber to 180° C. creates the danger of overheating the plastic, and the properties of the plastic required for subsequent processing of the polymers deteriorate (its elasticity, toughness, and strength are decreased, and it becomes brittle).

In contrast to the known solutions more fasteners, e.g. bolts have been provided for attaching the collar 31, and the collar has been additionally welded for the attachment to endure, to achieve better resistance to the vibration occurring during the recycling process.

The system presented in FIG. 1 performs preliminary crushing 3 of the mixed plastic waste during preliminary processing; after that metal separation with the magnetic separator 4 takes place; then the waste is taken to the air separator 6 with the conveyor 5 for separating non-plastic material; the broken up plastic waste with metals and other non-plastic materials separated from it is subsequently taken to the collecting container 7, and from there to the device for recycling mixed plastic waste 9 on the conveyor 8 for recycling through mixing, melting and crushing, involving disinfection of the bacterial and organic materials, and the compacting process of the mixed plastic waste at their melting temperature; the plastic mass obtained by recycling is taken to the after-cooler 11 from the device for recycling mixed plastic waste 9, and to the homogenisation system 13 following the after-cooling.

The waste crusher 3 or the pre-crushing system ensures efficient preliminary crushing of the mixed plastic waste. The speed of the feed conveyor 2 for transporting the waste to the pre-crusher 3 is appropriately adjusted to maintain uniform input flow to the pre-crusher 3 according to the waste spreading productivity. A magnetic separator separating metals from the crushed mixed plastic waste is used as the metal separator 4. The capacity of the metal separator 4 has been chosen as optimal for the material flow coming from the crusher. The first conveyor line 5 transports the crushed mixed plastic waste to the subsequent stage at the air separator 6. Non-polymer substances mixed with the plastic, for example sand, glass, nonferrous metals (aluminum, copper), minerals etc. are separated using the air separator 6. This does not involve separation of the mixed plastic by polymer types. The air separation stage also involves the initial mixing of the mixed plastic waste. Due to the large cubic content of the mixed plastic waste the crushed mixed plastic waste is transported to the collecting container 7, equipped with automatic conveyors for moving the crushed plastic waste. The purpose of the collecting container 7 is to create a raw material buffer preferably holding 3-4 tons of material. The second conveyor line 8 controls the transportation of the mixed plastic waste to the compacting and sanitation stage of the mixed plastic waste recycling process according to the present invention in the device for recycling mixed plastic waste 9.

The method for recycling mixed plastic waste according to the present invention includes preliminary processing of the mixed plastic waste, routing of the pre-processed mixed plastic waste to the device for recycling mixed plastic waste 9, recycling of the mixed plastic waste in the device 9 by heating, melting, mixing, reducing the cubic content of the recycled material, rapid cooling with tempering, crushing, and additional after-cooling and homogenisation. The device for recycling mixed plastic waste 9 performs thermal processing of the material, the melting process and finally crushing of the material recycled from the mixed plastic waste into granules. The device for recycling mixed plastic waste 9 reduces the cubic content of the mixed plastic waste, increases their density, processes the mixed plastic waste mechanically and thermally until melted, and mixes the mixed plastic waste in a molten state, thereat also eliminating the organic and bacterial input, rapidly cools down the plastic mass obtained by melting and mixing until it hardens, crushes the hardened plastic mass into particles, and routes it to after-cooling and homogenisation. The recycled plastic mixture obtained has a fragment size of approximately 3-10 mm, moisture content below 1%, and is stable raw material for the subsequent production process characterized by its melt flow index, melting temperature, density, and granule size.

Then the granules are transported to the after-cooling system 11 using the cyclone conveyor 10, as the material is output from the production process at a temperature exceeding 100 degrees due to high temperatures generated by the production process of the device for recycling mixed plastic waste. The known solutions route the compacted clean materials recycled from single-type plastic to subsequent regranulate production; according to the present invention the material passes through an additional several-hour cooling cycle in the cooling tower. The after-cooler 11 is designed to preserve the plastic properties and fraction of the material. Following the after-cooling, the material is taken to the homogenisation system 13 on the conveyor 12 where mixing of the material takes place. The homogenisation system 13 comprises a container mixer of at least 28 m$^3$, enabling the mixing of the materials with each other and the homogenisation of the raw material mixture by batches of at least 10 to 15 tons. Unlike known container mixers, an inflow of warm air has been added to the container mixer of the present solution, to also achieve efficient drying along with the mixing.

As a result of the high temperature created in the course of the mixed plastic waste recycling process, the plastic mass recycled from mixed plastic waste is output at the temperature of approximately 115° C. to 165° C. Unlike the generally known processes that route the compacted clean single-type plastics to subsequent regranulate production, according to the present invention the material passes through an additional several-hour cooling cycle in the cooling tower 11, during which the material is mixed, and gradually cooled, this way stabilising the properties of the recycled polymer mixture for the subsequent production cycle. The material is after-cooled to the temperature of approximately 30-40° C.

During the recycling stage the blade system 33 of the device for recycling mixed plastic waste is started in the device 9 with the help of the motor 26 at the approximate rotation speed of 1200 rpm. The mixed plastic waste to be recycled in a quantity of 60-150 kg is taken in the agglomeration chamber 16 via the inlet opening 21. The mixed plastic waste is crushed by the blade system 33, at the same time mixing it; the mixed plastic waste starts to heat and melt due to friction. The mixed plastic waste starts to melt at the temperature of approximately 140-150° C., the amperage of the motor 26 is approximately 400 A. The temperature rises to approximately 160° C. in the agglomeration chamber, and the amperage increases to 600 A. Upon achieving this, about 2-3 liters of cold water is sprayed, instantly lowering the temperature to about 80° C. The blade system 33 continues to rotate at the same time.

The exhaust fan for water vapor 52 is started before spraying the water. The molten mass hardens as the water is sprayed, and the blades still rotating start to crush the hardened mass. The temperature starts to rise again, and the outlet port 19 is opened at the temperature of 100-110° C. The amperage starts to rise as well and will increase to 600 amperes. The crushed fragments of the recycled mixed plastic waste are taken from the agglomeration chamber 16 of the device for recycling mixed plastic waste 9 to cool down in the cyclone of the after-cooler 9 by using centrifugal force, to make the material release heat into the air, not coming in contact with any other materials.

What is claimed is:

1. A device for recycling mixed plastic, said device comprising:
   an agglomeration chamber base;
   an agglomeration chamber attached to the agglomeration chamber base, wherein the agglomeration chamber comprises a bottom and a double wall;
   an observation and service opening in the double wall of the agglomeration chamber;
   an outlet port in the double wall of the agglomeration chamber;
   a loading chamber attached to the agglomeration chamber, wherein the loading chamber is equipped with a loading port, an upper observation opening, and an exhaust fan for water vapor;
   a collar attached to the bottom of the agglomeration chamber;
   a blade system at the bottom of the agglomeration chamber, wherein the blade system comprises a blade holder, two material exit guides, two inner blades, two outer blades, two blade mounting plates with fastening holes, and fasteners;
   a motor, capable of rotating the blade system, wherein the motor is connected to the blade system through a shaft;
   a cooling system equipped with a cooling inlet, and a cooling outlet;
   a transmission and lubricating chamber with a preheater equipped lubricating pump; and
   a switchboard capable of operating the device;
   wherein:
   the shaft comprises a bearing pedestal with closed bearings and pressure seals, and cutting angle α of the blade mounting plates and cutting angle β of the inner and outer blades are approximately 28° to 32°, and angle γ between cutting edge of the inner blades, and edge on side of the material exit guides is approximately 50°.

2. The device according to claim 1, wherein the double wall of the agglomeration chamber comprises at least three replaceable parts with their height greater than thickness of belt of mixed plastic waste being recycled in the agglomeration chamber, and height to which mixed plastic waste particles can be thrown in course of crushing process.

3. The device according to claim 1, wherein the blade system is capable of rotating at approximately 1200 rpm, the motor is capable of operating at amperage approximately 600 A, and temperature in the agglomeration chamber being approximately 140 to 160° C. during recycling process.

4. The device according to claim 1, wherein distance between the outer blades of the blade system and the double wall of the agglomeration chamber is approximately equal to thickness of the blades.

5. A device according to claim 1, wherein:
   the blades are attached to the blade holder with cutting surface of the blades towards the bottom of the agglomeration chamber, and bottom surface of the blades upwards, and wherein the blades and the blade mounting plates of the blade system form an even surface, with the fasteners tightened.

6. The device according to claim 1, wherein cutting surface of the blades has been hardfaced, and cutting edge of the blades has been blunted by hardfacing.

7. The device according to claim 1, wherein cutting surface of the blade mounting plates of the blade system has been hardfaced, and hardfacing has been provided in front of the fastening holes of the blade mounting plates in rotating direction.

8. The device according to claim 1, wherein the material exit guides have been hardfaced.

9. A method for recycling mixed plastic waste comprising the steps of:
   obtaining pre-processed mixed plastic waste by preliminary processing of the mixed plastic waste;
   routing 60-150 kg of the pre-processed mixed plastic waste to the agglomeration chamber of the device according to claim 1;
   utilizing the device to:
     achieve amperage of approximately 400 A for the motor of the device;
     rotate the blade system of the device at an approximate speed of 1200 rpm;
     crush and simultaneously mix the pre-processed mixed plastic waste by rotating blade system;
     allow temperature of the agglomeration chamber to rise to 140-150° C., wherein the temperature rises due to mechanical friction while crushing of the pre-processed mixed plastic waste;
     heat and melt the pre-processed mixed plastic waste to obtain molten plastic mass;
     increase amperage of the motor to approximately 600 A;
     allow temperature of the agglomeration chamber to rise to 150-160° C.;
     harden the molten plastic mass by rapid cooling to obtain a hardened mass;
     crush the hardened mass by rotating blade system to obtain crushed mixed plastic;
     allow temperature of the agglomeration chamber to rise again to 100-110° C.;
     open the outlet port of the device; and
   routing the crushed mixed plastic from the agglomeration chamber to an after-cooler chamber, wherein the after-cooler chamber is designed to preserve plastic properties and fraction of the crushed mixed plastic;

routing the crushed mixed plastic from the after-cooler chamber to a homogenizing device; and homogenizing the crushed mixed plastic to obtain recycled mixed plastic.

10. The method according to claim 9, wherein the rapid cooling is achieved through spraying water at temperature of 4° C.-10° C., and in quantity of 2 to 3 liters decreasing temperature of the agglomeration chamber instantly to approximately 80° C.

11. The method according to claim 9, wherein the recycled mixed plastic has uniform size between 3-10 mm, and moisture content below 1%.

12. The method according to claim 9, wherein a cycle from preliminary processing to obtaining recycled mixed plastic lasts for 5-15 minutes.

* * * * *